(12) United States Patent
Rafey et al.

(10) Patent No.: US 7,783,703 B2
(45) Date of Patent: Aug. 24, 2010

(54) SHARED HOME MEDIA PLATFORM TO SUPPORT MULTI-USER CONTROL

(75) Inventors: Richter A. Rafey, Santa Clara, CA (US); Jacqueline L. Neider, San Francisco, CA (US); Jenny Dana Wirtschafter, Mountain View, CA (US); Simon John de Lancey Gibbs, San Jose, CA (US); Linghan Cai, Fremont, CA (US); William Abdo Rouady, Jr., Purcellville, VA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 265 days.

(21) Appl. No.: 11/699,798

(22) Filed: Jan. 29, 2007

(65) Prior Publication Data

US 2008/0184127 A1 Jul. 31, 2008

(51) Int. Cl.
*G06F 15/16* (2006.01)

(52) U.S. Cl. ............... 709/204; 709/203; 709/205; 709/217

(58) Field of Classification Search .......... 709/203, 709/217, 226, 229, 232, 204, 205, 223
See application file for complete search history.

(56) References Cited

U.S. PATENT DOCUMENTS

| | | | |
|---|---|---|---|
| 5,561,811 A | 10/1996 | Bier | 395/825 |
| 6,393,569 B1 * | 5/2002 | Orenshteyn | 709/203 |
| 6,564,246 B1 * | 5/2003 | Varma et al. | 709/217 |
| 6,573,926 B1 * | 6/2003 | Ichimura | 709/205 |
| 7,006,055 B2 | 2/2006 | Sukthankar et al. | 345/1.2 |
| 2003/0018719 A1 | 1/2003 | Ruths et al. | 709/205 |
| 2004/0117786 A1 | 6/2004 | Kellerman et al. | 717/170 |
| 2005/0024387 A1 | 2/2005 | Ratnakar et al. | 345/629 |
| 2005/0198578 A1 | 9/2005 | Agrawala et al. | 715/750 |
| 2006/0041678 A1 | 2/2006 | Morris | 709/236 |
| 2006/0143236 A1 | 6/2006 | Wu | 707/104.1 |
| 2006/0161621 A1 | 7/2006 | Rosenberg | 709/204 |
| 2006/0161635 A1 | 7/2006 | Lamkin et al. | 709/217 |
| 2006/0195465 A1 * | 8/2006 | Atchison et al. | 707/102 |
| 2007/0198534 A1 * | 8/2007 | Hon et al. | 707/10 |
| 2007/0239838 A1 * | 10/2007 | Laurel et al. | 709/232 |
| 2008/0140849 A1 * | 6/2008 | Collazo | 709/229 |

OTHER PUBLICATIONS

G. Abla et al., "Shared Display Wall Based Collaboration Environment in the Control Room of the DIII-D National Fusion Facility" General Atomics, P.O. Box 85608, San Diego, California 92186-5608, Department of Computer Science, Princeton University, pp. 1-8.

(Continued)

*Primary Examiner*—Ramy M Osman
(74) *Attorney, Agent, or Firm*—Haverstock & Owens LLP

(57) ABSTRACT

A system for and method of enabling people to share a common application context for media presentation and playback is described herein. The presentation results from input from a set of active participants where the input includes a set of media types such as music, artwork, visualizations, photographs and text messages. The participants use personal devices to couple to the system and utilize the application.

83 Claims, 3 Drawing Sheets

OTHER PUBLICATIONS

Harry Brignull et al., "The introduction of a shared interactive surface into a communal space" CSCW '04, Month 1-2, 2004, Copyright 2004.

Eric A. Bier et al. "MMM: A User Interface Architecture for Shared Editors on a Single Screen" Xerox PARC, 3333 Coyote Hill Road, Palo Alto, CA 94304, Cambridge University, Cambridge, England, Nov. 11-13, 1991, pp. 79-91.

Ali Mazalek (Synaesthetic Media Lab, Georgia Tech, Atlanta, GA), Glorianna Davenport (Media Fabrics Group, MIT Media Lab, Cambridge MA) and Matthew Reynolds (ThingMagic, Cambridge, MA)l., "Sharing and Browsing Media on a Digital Tabletop" pp. 1-11.

* cited by examiner

Fig. 1 System Components

Fig. 2 Application Flow

Example of Shared Presentation

Sample content:
1 - Photo from local client (initial presentation)
2 - Photo from client 1
3 - Cover art/info for song from local collection
4 - Text from text message from client 1
5 - Video clip from client 2
6 - Background art/animation

SHARED HOME MEDIA PLATFORM TO SUPPORT MULTI-USER CONTROL

FIELD OF THE INVENTION

The present invention relates to the field of computing. More specifically, the present invention relates to digital media presentation and playback.

BACKGROUND OF THE INVENTION

Most digital media solutions are designed for personal rather than social consumption, yet in many situations, people want to share the media consumption experience. Today's solutions for social consumption are mostly located on devices (e.g. Microsoft Media Center Edition on a PC) that typically are not in physical locations in the home conducive to multi-user consumption. Another approach to sharing content is entirely physical, where people literally pass around small devices with screens, such as cell phones. As better solutions emerge to make that content easily available on large screens such as televisions, people will want to share control of the presentation of content without having to take turns using a single device such as a remote control or an attached PC.

People are rapidly adopting network- and media-capable portable devices, but there is no general solution for enabling people with such devices to share control of a presentation of media on a common surface such as a television. In particular, there is a lack of solutions for more advanced requirements like using their personal communication devices (e.g. cellular phones) to browse and select from content that is available in the home media collection or transmitting their own content for inclusion in an ongoing media presentation on a television set in the home.

There has been a lot of existing research about shared screen spaces for social applications and for cooperative work. These activities do not target an in-home situation where a person has a media server that specifically supports multi-user control of a presentation of their personal media collection by a set of participants with personal network-capable devices.

There are also numerous solutions for jukebox-style applications in homes, with Microsoft Media Center Edition Party Mode (MCE) being a good example. MCE does not offer a means of multi-user control beyond individuals taking turns interacting directly with the PC. The control does not extend to personal portable devices like cell phones. Also, such applications do not go beyond jukebox functionality to enable more dynamic interaction with the shared presentation.

In the specific area of using remote devices to control media in the home, there are solutions emerging like having a TiVo Personal Video Recorder (PVR) controlled by a cell phone or consumer electronics devices controlled through a remote connection like SlingMedia's Slingbox®. These solutions are geared toward control of one or more devices by a single user, but not toward common control of a shared media presentation by multiple users.

SUMMARY OF THE INVENTION

A system for and method of enabling people to share a common application context for media presentation and playback is described herein. The presentation results from input from a set of active participants where the input includes a set of media types such as music, artwork, visualizations, photographs and text messages. The participants use personal devices to couple to the system and utilize the application.

In one aspect, a system for sharing digital content in a presentation comprises a server for receiving and managing the digital content, a server application stored on the server for providing a user interface, a display coupled to the server for displaying the digital content, a client device coupled to the server for interacting with the digital content and a client application stored on the client device for communicating with the server. The system further comprises an audio player coupled to the server for playing audio. Any of the server, the display and the audio player are contained within a single unit. The client device couples to the server through a mechanism selected from the group consisting of a network and a direct connection. The network is selected from the group consisting of the Internet, a local area network and a private network. The direct connection is selected from the group consisting of Near Field Communication, Bluetooth, Firewire, Wi-Fi and Universal Serial Bus. The server application specifies the digital content available and launches a set of communication services for receiving requests. Communicating with the server includes browsing and selecting available digital content and transmitting new digital content to the server. The digital content is synchronized. Requests are transmitted by the client device to the server for content playback. The requests are made from a collection of data available to the server. The server responds to the requests by queuing the digital content for presentation on the display. The client device transmits desired digital content to the server. The server generates a log corresponding to the presentation. The log is generated as participants select and transmit digital content, wherein the log enables replay of the presentation. The log is in a standard format for easy distribution as a web log. A location of the web log is automatically transmitted to participants. The client application includes data reflecting a state of the server. The digital content is preloaded on the server. The server is for configuring sources and destinations for the digital content and playback, initializing and controlling settings for the presentation and controlling the presentation. The client device is for browsing available digital content on the server and requesting selected digital content to be added to the presentation and uploading additional digital content to the server. The presentation is remotely viewed as a web log.

In another aspect, a method of sharing digital content in a presentation comprises storing the digital content on a server, receiving additional digital content from one or more client devices, presenting the digital content and the additional digital content on a display and saving log data of the digital content and the additional digital content. The method further comprises presenting a user interface on the display. The method further comprises playing the digital content when requested. The method further comprises posting the log data to an Internet web log.

In another aspect, a method of implementing a server application to share digital content in a presentation comprises launching a server application, launching a POP server to handle client content transmissions, launching an upload service to handle content requests including local requests and client requests, presenting a user interface on a display, handling the local requests and the client requests, updating the user interface on the display, managing the digital content and playing the digital content when requested. The method further comprises saving log data of the digital content. The method further comprises posting the log data to an Internet web log.

In another aspect, a method of implementing a client application to share digital content in a presentation comprises launching the client application, establishing a connection with a server, requesting server data related to content available for playback, requesting the content from a list of the available content to add to the presentation and uploading desired additional content to add to the presentation.

In yet another aspect, a network of devices for sharing digital content in a presentation comprises a server for receiving and managing the digital content, a server application stored on the server for providing a user interface, an audio player coupled to the server for playing audio, a display coupled to the server for displaying the digital content, one or more client devices coupled to the server for interacting with the digital content and a client application stored on each of the client devices for communicating with the server, wherein the one or more client devices couple to the server through a mechanism selected from the group consisting of a network and a direct connection. The network is selected from the group consisting of the Internet, a local area network and a private network. The direct connection is selected from the group consisting of Near Field Communication, Bluetooth, Firewire, Wi-Fi and Universal Serial Bus. The server application specifies the digital content available and launches a set of communication services for receiving requests. Communicating with the server includes browsing and selecting available digital content and transmitting new digital content to the server. The digital content is synchronized. Requests are transmitted by each of the one or more client devices to the server for content playback. The requests are made from a collection of data available to the server. The server responds to the requests by queuing the digital content for presentation on the display. The one or more client devices each transmit desired digital content to the server. The server generates a log corresponding to the presentation. The log is generated as participants select and transmit digital content, wherein the log enables replay of the presentation. The log is in a standard format for easy distribution as a web log. A location of the web log is automatically transmitted to participants. The client application includes data reflecting a state of the server. The digital content is preloaded on the server. The server is for configuring sources and destinations for the digital content and playback, initializing and controlling settings for the presentation and controlling the presentation. The one or more client devices are for browsing available digital content on the server and requesting selected digital content to be added to the presentation and uploading additional digital content to the server. The presentation is remotely viewed as a web log.

In another aspect, a system for sharing digital content in a presentation comprises a server for receiving and managing the digital content and a server application stored on the server for providing a user interface, wherein the server is configured to receive additional digital content from a client device. The system further comprises a display coupled to the server for displaying the digital content. The system further comprises an audio player coupled to the server for playing audio. Any of the server, the display and the audio player are contained within a single unit. The client device couples to the server through a mechanism selected from the group consisting of a network and a direct connection. The network is selected from the group consisting of the Internet, a local area network and a private network. The direct connection is selected from the group consisting of Near Field Communication, Bluetooth, Firewire, Wi-Fi and Universal Serial Bus. The server application specifies the digital content available and launches a set of communication services for receiving requests. The digital content is synchronized. Requests are transmitted by the client device to the server for content playback. The requests are made from a collection of data available to the server. The server responds to the requests by queuing the digital content for presentation on the display. The server generates a log corresponding to the presentation. The log is generated as participants select and transmit digital content, wherein the log enables replay of the presentation. The log is in a standard format for easy distribution as a web log. A location of the web log is automatically transmitted to participants. The system further comprises a client application stored on the client device for communicating with the server. The client application includes data reflecting a state of the server. The digital content is preloaded on the server. The server is for configuring sources and destinations for the digital content and playback, initializing and controlling settings for the presentation and controlling the presentation. The client device is for browsing available digital content on the server and requesting selected digital content to be added to the presentation and uploading additional digital content to the server. The presentation is remotely viewed as a web log.

DETAILED DESCRIPTION OF THE PREFERRED EMBODIMENT

Figure 1:
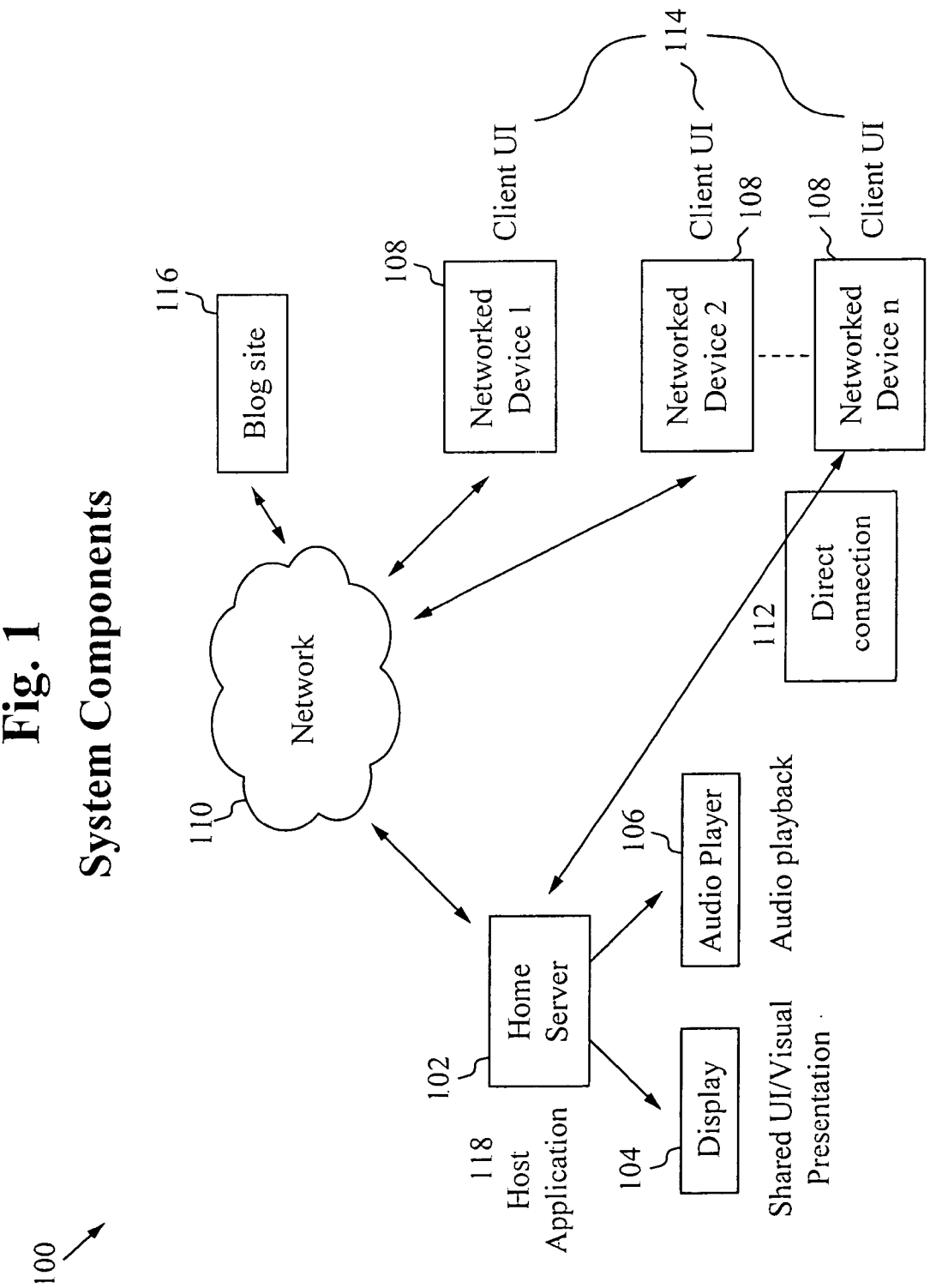
FIG. 1 illustrates a block diagram of an embodiment of the present invention.

The shared home media platform is a new system in the home for enabling multiple people to share a common application context for media presentation/playback, with the presentation resulting from input from the set of active participants, and blending a set of media types (e.g. music, associated artwork, visualizations, photos and text messages). The participants use their personal devices to couple to the system and control the application. The presentation offers a common view, for instance, on a television screen that the participants are able to view together, as well as output of the complete presentation or of parts (e.g. only the music or the photos) to additional devices like a home audio system or other networked devices, or even the Internet. The application on the client devices that are coupled to the system includes data reflecting the state of the system in the home, providing a common context for the application across the devices. The data includes the status of the server, the system configuration and other relevant information to enable remote devices to utilize the system. As participants select or transmit media, which is able to be a blend of multiple formats, to be added to the presentation, the system maintains an ongoing log of this information. This log is available for inspection and future replay, and as a result, the group of participants, are able to collaborate via their personal devices to generate a media presentation that is able to persist and enable future access to the media component of the social experience.

An example illustrates the use of the shared home media platform. A participant for an event such as a party launches an application hosted on a home server. The server has access to media that is available for playback within the home, and the ability to control playback of the content and present views of the state of the application on a common display such as a television. In an embodiment, the home server is coupled to a storage server which contains additional media such as archived songs, movies and pictures. The home server is also able to use its network connection to access any data available via the Internet. A participant is able to choose to preload a set of content (e.g. music or photos) for playback as part of the shared media presentation. Participants who are aware of or invited to the event are able to couple to the server and run a companion application on networked client devices that are able to communicate directly with the in-home server. Participants are able to transmit requests for media to be played back (e.g. a song from the collection that is available to the server) or they are able to transmit the content itself from their personal devices such as a cell phone or a PDA, as examples. The application on the server responds to the requests by queuing or launching the content for presentation on the common display (e.g. a jukebox or a photo slideshow) with associated playback on an appropriate target device in the home such as a home stereo. As part of concluding, the server packages the content that has been compiled for the shared presentation on a local file or a blog so that the playlist and photos/videos from the party are visible to the participants.

The shared home media platform includes a server that has a connection to control media renderers as well as a network connection to support connectivity to client devices. The server is able to be, but is not limited to, a personal computer, a Linux box or a Macintosh computer. The media renderers include but are not limited to displays and audio players. An arbitrary set of personal networked client devices are able to establish connections to the server and run a local application that communicates directly with the server. The client devices include but are not limited to cellular phones, network game consoles such as PlayStation Portables (PSP), Personal Digital Assistants (PDAs), laptop computers, digital cameras/camcorders or portable media players. A display such as a television, monitor or projector presents the shared interface and resultant content.

Two main applications are utilized in the shared home media platform. On the server there is a local client application with an associated User Interface (UI) for setting preferences, including possibly specifying content for the shared media presentation. The local application also launches a set of communication services for fielding requests from clients, including a local client. On the client devices, a separate application enables browsing and selection of available content and/or ability to transmit new content to be added to the presentation.

The playback of various media types are able to be synchronized (e.g. a photo of the person requesting a song or cover art while the song plays) or not, and audio and visual playback are able to take place simultaneously.

The media included in the presentation is also able to include text messages.

Various methods are able to be used to establish the connection between the client devices and the server, such as Near Field Communication, Bluetooth or USB, in addition to a pure Internet connection. Other networks such as Local Area Networks (LANs) and private networks are also able to be used to establish a connection between the client devices and the server.

The networked devices that act as clients are able to be at a remote location while still contributing to the shared media presentation. It is possible to save the resultant shared presentation as a self-contained entity that enables reproducing the digital media playback or posting it in a standard format such as a web log (blog) on the Internet. The system is able to automatically transmit information on where to retrieve the content in the future to the participants. For example, an email is automatically sent to each participant's email address where the email includes the web address of the blog.

FIG. 1 illustrates a block diagram of an embodiment of the shared home media platform. A system 100 for sharing and presenting digital content includes a home server 102, a display 104, an audio player 106 and one or more networked devices 108. The home server 102 is any computing device that is capable of receiving digital media. The home server 102 preferably has network capabilities. The display 104 is coupled to the home server 102 for displaying the digital media stored on the home server 102. The display 104 also displays the user interface to allow participants to interact with the system 100. The audio player 106 provides audio playback for configurations that include audio. The networked devices 108 couple to the home server 102 via a network 110 such as the Internet or through a direct connection 112. This allows both remote and local transfers of data to the home server 102. For example, some people who cannot participate in person may still want to transfer content for a presentation. Both the local and remote participants are able to transfer their digital media to the home server 102 for sharing. The local participants are able to couple to the home server 102 by a direct connection 112 such as USB cables, Bluetooth®, Firewire®, Wi-Fi or any other connection, including a network 110 such as the Internet. The remote participants are able to couple to the home server 102 via the network 110 since they are not within the proximity to couple directly to the home server 102. The home server 102 includes a host application 118 for providing a user interface to the participants in addition to managing the presentation of the digital media. The networked devices 108 each include a client user interface 114. The client user interface 114 establishes a connection with the home server 102 in addition to providing the ability to upload content to add to the shared presentation. Some client devices do not have network capabilities, but simply have direct connection 112 capabilities. In an embodiment, a web log (blog) is generated from the shared data, so that users are able to review the shared presentation at a later date.

Figure 2:
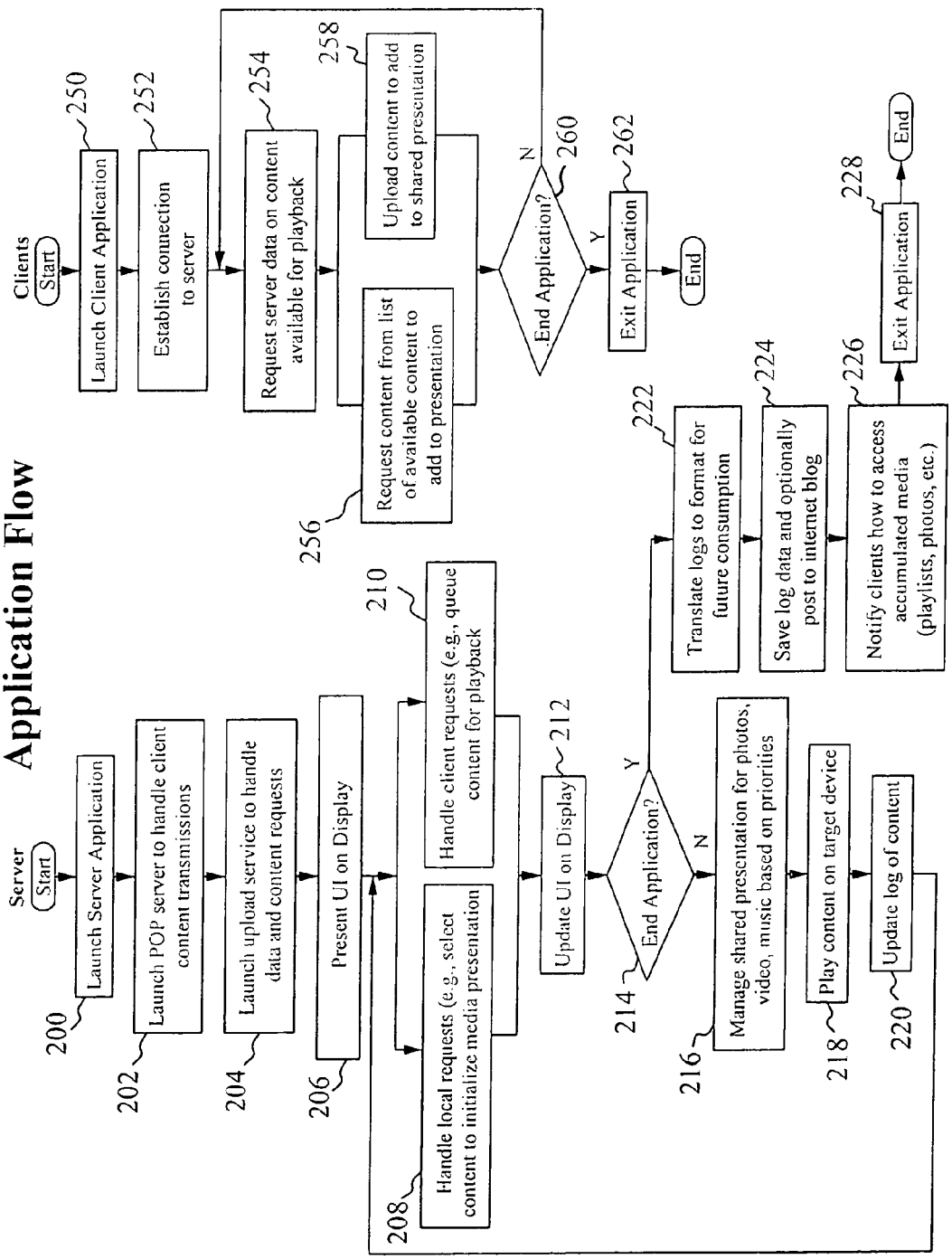
FIG. 2 illustrates a flowchart of the applications running on the server and the client devices.

FIG. 2 illustrates a flowchart of the flow of the applications running on the server and the client devices. The server application begins when it is launched, in the step 200. A POP server is launched to handle client content transmissions, in the step 202. In the step 204, an upload service is launched to handle data and content requests. The user interface is then presented on the display, in the step 206. In the steps 208 and 210, the local requests and the client requests are handled, respectively. Handling local requests includes selecting content to initialize media presentation. Handling client requests includes queuing content for playback. In the step 212, the user interface is updated. If the application is not ended in the step 214, then the shared presentation for photos, video and music based on priorities is managed, in the step 216. The content is then played on the target device such as the display, in the step 218. The log of the content is updated, in the step 220. The flow then resumes after the step 206. If the application is ended in the step 214, then the logs are translated to a format for future consumption, in the step 222. In the step 224, the log data is saved and optionally posted to an Internet blog. Clients are then notified how to access the accumulated media, in the step 226. The application is then exited in the step 228.

The client device has its own application utilized in the shared home media platform. In the step 250, a client application is launched. In the step 252, a connection is established with the server. Server data related to available content is requested for playback, in the step 254. In the steps 256 and 258 respectively, content from a list of available content is requested to add to the presentation and content not yet available is uploaded to add to the presentation. If the application is ended in the step 260, then the application exits, in the step 262. If the application is not ended in the step 262, then the flow resumes after the step 252.

Figure 3:
FIG. 3 illustrates a schematic screen layout of an example of a shared presentation.

FIG. 3 illustrates a schematic screen layout of an example of a shared presentation 300. In the example, users are presenting information that might relate to an ongoing party including imagery associated with selected music. The shared presentation 300 includes a photo that is stored on a local client 301 as the initially presented media. Then, a photo from a networked client 302 is added. The photo is from the user's cellular phone and provides a way to "virtually" participate in a social event. Cover art/information 303 for the currently playing songs from a local collection is also included. Text 304 from a text message from the first client is presented wherein the text may be a greeting to the people who are attending the event in person. A video clip 305 from a second client is also posted. The video clip 305 is a video snippet that has then been transferred to the presentation 300. Background art/animation 306 is also included such as a wallpaper image of the currently playing artist.

When generating a presentation, local clients and networked clients are both able to configure and interact with the presentation. For example, local clients are able to configure sources and destinations for content and playback. Additionally, the local clients initialize and control settings such as a theme, music, imagery and marquis text. The local clients also control the presentation. The networked client devices, in this example, browse available content on the home network. The networked client devices also request content from locally available content in addition to uploading content to be added to the presentation.

The above example is not meant to limit the shared home media platform in any way. In other implementations, networked devices are able to control the presentation and perform other functions that the local client devices are designated to perform in this example.

To utilize the shared home media platform, users couple to a home server with client devices, either locally or remotely. Utilizing an application on the home server in conjunction with a client device application, the users are able to present and interact with digital media on the home server. A user interface included with the home server application enables easier presentation of the data. Users are able to incorporate digital content that is already stored on the home server. Users are also able to link to or upload additional data from their own client devices. The digital content is then presented and shared on the display and/or audio device, so that users are able to easily view and/or listen to the shared set of digital content. Users are able to simply show the content such as a picture and are also able to change the layout, flow, or content that may be comprised of a mixture of several types of content (e.g. pictures, text and video) from a range of sources. In an embodiment, a web log is generated which includes the shared content.

In operation, the shared home media platform allows many users to share digital content on a server with a display and audio system easily. Instead of users simply passing around cell phones, PDAs, MP3 players and cameras, users are able to couple to the server and manage and transfer their content to the server for others to view, play and hear. Multiple users in remote locations are also able to contribute to a presentation using the shared home media platform. For example, the shared home media platform is useful for weddings. Assume a person is unable to attend the wedding in person, but is able to view a presentation of the wedding later on. The relatives gather for the wedding, and people are taking pictures from different angles and capturing different aspects of the wedding with digital cameras and cell phone cameras. The person who was unable to attend is able to relive the moment by more than simply looking through a photo album or a video taken from one aspect by a videographer. Those people who took pictures and videos are able to join together and display their digital content using a server with the user interface. The newly married couple is then able to decide which pictures are worth keeping and which are not, and is able to organize them as they see fit instead of having a photographer use his own personal preferences. The compiled presentation is then able to be viewed by the relative who did not attend the wedding. The presentation is also possibly a better collection of memories than the photo album and video by the professionals because it includes more viewpoints and is a much more personalized creation. Another implementation at a wedding is for people to bring their digital memories of the bride and groom. The memories are stored on cellular phones, PDAs, laptops and are easily put together in a presentation using the shared home media platform. The different memories are then able to be shared with the other guests while they attend the wedding. The musical playlist is also able to be captured and shared later.

Another implementation includes students generating a virtual yearbook wherein each student gathers photos, movies and songs from their personal collection of cell phones, digital cameras, and computers and makes them available on a central server. However, instead of simply dumping all of the digital content onto the server for someone to randomly parse through, the students utilize the shared home media platform to methodically present and manage the content. For example, each student is able to present his/her digital content, and then other students are able to agree or disagree whether it is appropriate for the yearbook. Text messages of students are even able to be included in the yearbook. For collages of images within the yearbook, students are also able to upload and manipulate the images so that the appropriate configuration is established. The shared home media platform not only allows the process to occur digitally, but also remotely for students who are unable to attend locally. With the ability of turning the shared presentation into a web page or a blog, the students are able to publish their yearbook online for others to view. Thus, a digital yearbook which includes not only photographs, but also movies, music and text messages is able to be generated easily, efficiently and remotely if necessary.

Another exemplary implementation is a camera phone party where a group of people get together to share their pictures taken with their camera phones. Each user couples his/her camera phone to a home server. With an adapter that allows multiple devices to be coupled to the same server, all of the camera phones are able to be coupled at the same time. Then, using the user interface of the server application, the users are able to view and present their pictures on a display. The user interface provides a simple way of locating and displaying the pictures. This provides better clarity, easier use and more enjoyment of sharing pictures than individually handing each others phones with 1.5"×1.5" screens.

The shared home media platform is able to be implemented in a variety of locations for a multitude of tasks such as at an office for a business conference, at a party or wedding for entertainment or at a school for promoting student interaction.

In an embodiment, a single device integrates the home server with the display, and/or the audio player instead of separately coupled devices.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for sharing digital content in a presentation comprising:
   a) a server for receiving and managing the digital content;
   b) a server application stored on the server for executing the presentation, wherein the presentation includes a plurality of specific digital content items selected from the digital content on the server and sequentially rendered according to a queue;
   c) a media renderer coupled to the server for rendering the presentation;
   d) a plurality of client devices coupled to the server for interacting with the digital content; and
   e) a client application stored on each client device for communicating with the server and providing real-time common control of a real-time rendering of the presentation by each of the plurality of client devices, wherein each client application enables a user of each of the plurality of devices to contribute to the digital content on the server and to browse and select from the digital content on the server for the presentation, thereby providing real-time contribution of specific digital content items to the presentation while the presentation is being rendered.

2. The system as claimed in claim 1 wherein the media renderer comprises one or more of a display device and an audio player.

3. The system as claimed in claim 2 wherein any of the server, the display and the audio player are contained within a single unit.

4. The system as claimed in claim 1 wherein the client device couples to the server through a mechanism selected from the group consisting of a network and a direct connection.

5. The system as claimed in claim 4 wherein the network is selected from the group consisting of the Internet, a local area network and a private network.

6. The system as claimed in claim 4 wherein the direct connection is selected from the group consisting of Near Field Communication, Bluetooth, Firewire, Wi-Fi and Universal Serial Bus.

7. The system as claimed in claim 1 wherein the server application specifies the digital content available and launches a set of communication services for receiving requests.

8. The system as claimed in claim 1 wherein communicating with the server further comprises transmitting new digital content to the server.

9. The system as claimed in claim 1 wherein the digital content is synchronized.

10. The system as claimed in claim 1 wherein requests are transmitted by the client device to the server for content playback.

11. The system as claimed in claim 10 wherein the requests are made from a collection of data available to the server.

12. The system as claimed in claim 11 wherein the server responds to the requests by queuing the digital content for presentation on the display.

13. The system as claimed in claim 1 wherein the client device transmits desired digital content to the server.

14. The system as claimed in claim 1 wherein the server generates a log corresponding to the presentation.

15. The system as claimed in claim 14 wherein the log is generated as participants select and transmit digital content, wherein the log enables replay of the presentation.

16. The system as claimed in claim 14 wherein the log is in a standard format for easy distribution as a web log.

17. The system as claimed in claim 16 wherein a location of the web log is automatically transmitted to participants.

18. The system as claimed in claim 1 wherein the client application includes data reflecting a state of the server.

19. The system as claimed in claim 1 wherein the digital content is preloaded on the server.

20. The system as claimed in claim 1 wherein the server is for:
   a) configuring sources and destinations for the digital content and playback;
   b) initializing and controlling settings for the presentation; and
   c) controlling the presentation.

21. The system as claimed in claim 1 wherein the client device is for:
   a) browsing available digital content on the server; and
   b) requesting selected digital content to be added to the presentation and uploading additional digital content to the server.

22. The system as claimed in claim 1 wherein the presentation is remotely viewed as a web log.

23. A method of sharing digital content in a presentation comprising:
   a) storing the digital content on a server;
   b) receiving additional digital content on the server from one or more client devices;
   c) selecting from the digital content and the additional digital content by the one or more client devices thereby forming a presentation queue, wherein each of the client devices is enabled to select from the digital content and the additional digital content to form the presentation queue;
   d) sequentially rendering any selected digital content and additional digital content according to the presentation queue, wherein each of the client devices is further enabled to select in real-time from the digital content and the additional digital content to contribute in real-time to the presentation queue while the selected digital content and additional digital content is being rendered; and
   e) saving log data of the sequentially rendered digital content and additional digital content.

24. The method as claimed in claim 23 further comprising presenting a user interface on a media rendering device.

25. The method as claimed in claim 23 further comprising playing the digital content when requested.

26. The method as claimed in claim 23 further comprising posting the log data to an Internet web log.

27. A method of implementing a server application to share digital content in a presentation comprising:

a) launching a server application on a server for executing the presentation;
b) launching a POP server on the server to handle client content transmissions;
c) launching an upload service on the server to handle content requests including local requests and client requests from one or more client devices for selected digital content stored on the server, wherein the selected digital content is added to the presentation, further wherein a client application is stored on each of the one or more client devices for communicating with the server and providing real-time common control of a real-time rendering of the presentation;
d) presenting a user interface on a display of the server;
e) handling the local requests and the client requests;
f) updating the user interface on the display;
g) managing the digital content; and
h) sequentially rendering the selected digital content according to a queue, wherein each of the client devices further enables a user to browse and select in real-time from the digital content on the server, wherein one or more of the client requests are generated in real-time, thereby providing real-time contribution of selected digital content to the queue during rendering.

28. The method as claimed in claim 27 further comprising saving log data of the sequentially rendered digital content.

29. The method as claimed in claim 28 further comprising posting the log data to an Internet web log.

30. A method of implementing a client application to share digital content in a presentation comprising:
a) launching the client application on a client device, the client application for providing real-time common control of a real-time rendering of the presentation;
b) establishing a connection between the client device and with a server;
c) requesting by the client device server data related to content available for playback;
d) requesting by the client device the content from a list of the available content to add to the presentation; and
e) uploading desired additional content from the client device to the server to add to the presentation such that the requested content and the uploaded desired additional content is sequentially rendered by the server according to a queue, wherein the client device further enables a user to browse and select in real-time from the digital content and the additional content on the server, wherein one or more of the content requests are generated in real-time, thereby providing real-time contribution of content to the presentation during rendering.

31. A network of devices for sharing digital content in a presentation comprising:
a) a server for receiving and managing the digital content;
b) a server application stored on the server for executing the presentation, wherein the presentation includes a plurality of specific digital content items selected from the digital content on the server, further wherein the server application sequentially executes the plurality of specific digital content items according to a queue;
c) an audio player coupled to the server for playing audio;
d) a display coupled to the server for displaying the digital content;
e) one or more client devices coupled to the server for interacting with the digital content; and
f) a client application stored on each of the client devices for communicating with the server and providing real-time common control of a real-time rendering of the presentation by each of the plurality of client devices, wherein each client application enables a user of each of the plurality of devices to contribute to the digital content on the server and to browse and select from the digital content on the server for the presentation, thereby providing real-time contribution of specific digital content items to the presentation while the presentation is being rendered, wherein the one or more client devices couple to the server through a mechanism selected from the group consisting of a network and a direct connection.

32. The network of devices as claimed in claim 31 wherein the network is selected from the group consisting of the Internet, a local area network and a private network.

33. The network of devices as claimed in claim 31 wherein the direct connection is selected from the group consisting of Near Field Communication, Bluetooth, Firewire, Wi-Fi and Universal Serial Bus.

34. The network of devices as claimed in claim 31 wherein the server application specifies the digital content available and launches a set of communication services for receiving requests.

35. The network of devices as claimed in claim 31 wherein communicating with the server further comprises transmitting new digital content to the server.

36. The network of devices as claimed in claim 31 wherein the digital content is synchronized.

37. The network of devices as claimed in claim 31 wherein requests are transmitted by each of the one or more client devices to the server for content playback.

38. The network of devices as claimed in claim 37 wherein the requests are made from a collection of data available to the server.

39. The network of devices as claimed in claim 38 wherein the server responds to the requests by queuing the digital content for presentation on the display.

40. The network of devices as claimed in claim 31 wherein the one or more client devices each transmit desired digital content to the server.

41. The network of devices as claimed in claim 31 wherein the server generates a log corresponding to the presentation.

42. The network of devices as claimed in claim 41 wherein the log is generated as participants select and transmit digital content, wherein the log enables replay of the presentation.

43. The network of devices as claimed in claim 41 wherein the log is in a standard format for easy distribution as a web log.

44. The network of devices as claimed in claim 43 wherein a location of the web log is automatically transmitted to participants.

45. The network of devices as claimed in claim 31 wherein the client application includes data reflecting a state of the server.

46. The network of devices as claimed in claim 31 wherein the digital content is preloaded on the server.

47. The network of devices as claimed in claim 31 wherein the server is for:
a) configuring sources and destinations for the digital content and playback;
b) initializing and controlling settings for the presentation; and
c) controlling the presentation.

48. The network of devices as claimed in claim 31 wherein the one or more client devices are for:
a) browsing available digital content on the server; and
b) requesting selected digital content to be added to the presentation and uploading additional digital content to the server.

49. The network of devices as claimed in claim 31 wherein the presentation is remotely viewed as a web log.

50. A system for sharing digital content in a presentation comprising:
   a) a server for receiving and managing the digital content; and
   b) a server application stored on the server for providing a user interface, wherein the server is configured to receive additional digital content from a client device and to receive requests transmitted by the client device to the server for playback of specific digital content, further wherein the server is configured to respond to the requests by queuing the specific digital content for sequential presentation on a media renderer, wherein the client device is enabled to provide real-time common control of a real-time rendering of the presentation, to allow a user to browse and select from the digital content and the additional digital content on the server and to provide real-time requests for contribution of specific digital content in real-time to the presentation on the media renderer, thereby providing real-time contribution of specific digital content items to the presentation while the presentation is being rendered.

51. The system as claimed in claim 50 further comprising a display coupled to the server for displaying the digital content.

52. The system as claimed in claim 51 further comprising an audio player coupled to the server for playing audio.

53. The system as claimed in claim 52 wherein any of the server, the display and the audio player are contained within a single unit.

54. The system as claimed in claim 50 wherein the client device couples to the server through a mechanism selected from the group consisting of a network and a direct connection.

55. The system as claimed in claim 54 wherein the network is selected from the group consisting of the Internet, a local area network and a private network.

56. The system as claimed in claim 54 wherein the direct connection is selected from the group consisting of Near Field Communication, Bluetooth, Firewire, Wi-Fi and Universal Serial Bus.

57. The system as claimed in claim 50 wherein the server application specifies the digital content available and launches a set of communication services for receiving requests.

58. The system as claimed in claim 50 wherein the digital content is synchronized.

59. The system as claimed in claim 50 wherein the requests are made from a collection of data available to the server.

60. The system as claimed in claim 50 wherein the server generates a log corresponding to the presentation.

61. The system as claimed in claim 60 wherein the log is generated as participants select and transmit digital content, wherein the log enables replay of the presentation.

62. The system as claimed in claim 60 wherein the log is in a standard format for easy distribution as a web log.

63. The system as claimed in claim 62 wherein a location of the web log is automatically transmitted to participants.

64. The system as claimed in claim 50 further comprising a client application stored on the client device for communicating with the server.

65. The system as claimed in claim 64 wherein the client application includes data reflecting a state of the server.

66. The system as claimed in claim 50 wherein the digital content is preloaded on the server.

67. The system as claimed in claim 50 wherein the server is for:
   a) configuring sources and destinations for the digital content and playback;
   b) initializing and controlling settings for the presentation; and
   c) controlling the presentation.

68. The system as claimed in claim 50 wherein the client device is for:
   a) browsing available digital content on the server; and
   b) requesting selected digital content to be added to the presentation and uploading additional digital content to the server.

69. The system as claimed in claim 50 wherein the presentation is remotely viewed as a web log.

70. A system for sharing digital content in a presentation comprising:
   a) a server for receiving, storing and managing the digital content, the server comprising a server application to execute the presentation, wherein the presentation comprises a plurality of specific digital content items of multiple types, selected from the digital content stored on the server and sequentially rendered according to a presentation queue;
   b) a plurality of output devices of different types coupled to the server to output the digital content within the presentation queue; and
   c) a plurality of client devices coupled to the server for interacting with the digital content, each client device comprising a client application to communicate with the server and provide real-time common control of real-time rendering of the presentation including the plurality of specific digital content items in the presentation queue by each of the plurality of client devices, wherein each client application enables a user of each of the plurality of devices to contribute to the digital content stored on the server and to browse and select from the digital content on the server in real-time for the presentation queue, thereby providing real-time contribution of specific digital content items to the presentation queue during the rendering of the presentation.

71. The system as claimed in claim 70 wherein the plurality of output devices comprises a display device and an audio player.

72. The system as claimed in claim 70 wherein the client devices couple to the server through a mechanism selected from the group consisting of a network and a direct connection.

73. The system as claimed in claim 72 wherein the network is selected from the group consisting of the Internet, a local area network and a private network.

74. The system as claimed in claim 72 wherein the direct connection is selected from the group consisting of Near Field Communication, Bluetooth, Firewire, Wi-Fi and Universal Serial Bus.

75. The system as claimed in claim 70 wherein the server generates a log corresponding to the presentation.

76. The system as claimed in claim 75 wherein the log is generated as participants select and transmit digital content to enable replay of the presentation.

77. A system for sharing digital content in a presentation comprising:
   a) a server for receiving and managing the digital content;
   b) a server application stored on the server, comprising a first and second presentation queue, and configured to execute the presentation, wherein the presentation comprises:

i) a first type of digital content items selected from the digital content; and ii) a second type of digital content items selected from the digital content, wherein the first and second type of digital content items are able to be rendered simultaneously, and further wherein the first type of digital content items are queued on the first presentation queue and the second type of digital content items are queued on the second presentation queue for sequencing the simultaneous rendering during the execution of the presentation;

c) a media renderer coupled to the server for rendering the presentation;

d) a plurality of client devices coupled to the server for interacting with the digital content; and e) a client application stored on each client device for communicating with the server and providing common control of the presentation by each of the plurality of client devices, wherein each client application enables a user of each of the plurality of devices to contribute to the digital content on the server and to select from the digital content first or second type digital content items for the presentation, thereby contributing to the first type items in the first queue or the second type items in the second queue.

78. The system as claimed in claim 77 wherein the first type of digital content items comprise either music, artwork, visualizations, photos, text messages or other media types.

79. The system as claimed in claim 78 wherein the second type of digital content items comprise either music, artwork, visualizations, photos, text messages or other media types, wherein the second type of digital content items are of a different media type than the first type of digital content items.

80. The system as claimed in claim 79 wherein the presentation further comprises one or more additional types of digital content items selected from the digital content, wherein the first, second and additional types are able to be rendered simultaneously and further wherein the additional type of digital content items are queued on one or more additional presentation queues for sequencing the simultaneous rendering during the execution of the presentation.

81. A system for sharing digital content in a presentation comprising:

a) a server for receiving and managing the digital content;

b) a server application stored on the server for executing the presentation, wherein the presentation includes a plurality of specific digital content items selected from the digital content on the server and sequentially rendered according to a queue, further wherein the server application is configured to provide real-time common control of a real-time rendering of the presentation, and to enable a user to browse and select from the digital content on the server for the presentation in real-time, thereby providing real-time contribution of specific digital content items to the presentation while the presentation is being rendered; and c) a media renderer coupled to the server for rendering the presentation.

82. A method of implementing a server application to share digital content in a presentation comprising:

a) launching a server application on a server for executing the presentation;

b) launching an upload service on the server to handle content requests for selected digital content stored on the server, wherein the selected digital content is added to the presentation, further wherein a client application is stored on each of the one or more client devices for communicating with the server and providing real-time common control of a real-time rendering of the presentation;

c) presenting a user interface on a display of the server;

d) handling the content requests;

e) updating the user interface on the display;

f) managing the digital content; and g) sequentially rendering the selected digital content according to a queue, wherein each of the client devices is further enabled to browse and select in real-time from the digital content on the server, wherein one or more of the content requests are generated in real-time, thereby providing real-time contribution of selected digital content to the queue during rendering of the presentation.

83. A system for sharing digital content in a presentation comprising:

a) a client device for sending digital content and content requests; and b) a client application stored on the client device for providing a user interface, wherein the client device is configured to send digital content to a server, to provide real-time common control of a real-time rendering of the presentation and to send content requests to the server to add specific digital content to presentation rendered on a media renderer, wherein the client application enables a user of the client device to browse and select from the digital content on the server, further wherein the client device is configured to provide real-time content requests for contribution of specific digital content in real-time to the presentation on the media renderer while the presentation is being rendered.

* * * * *